UNITED STATES PATENT OFFICE.

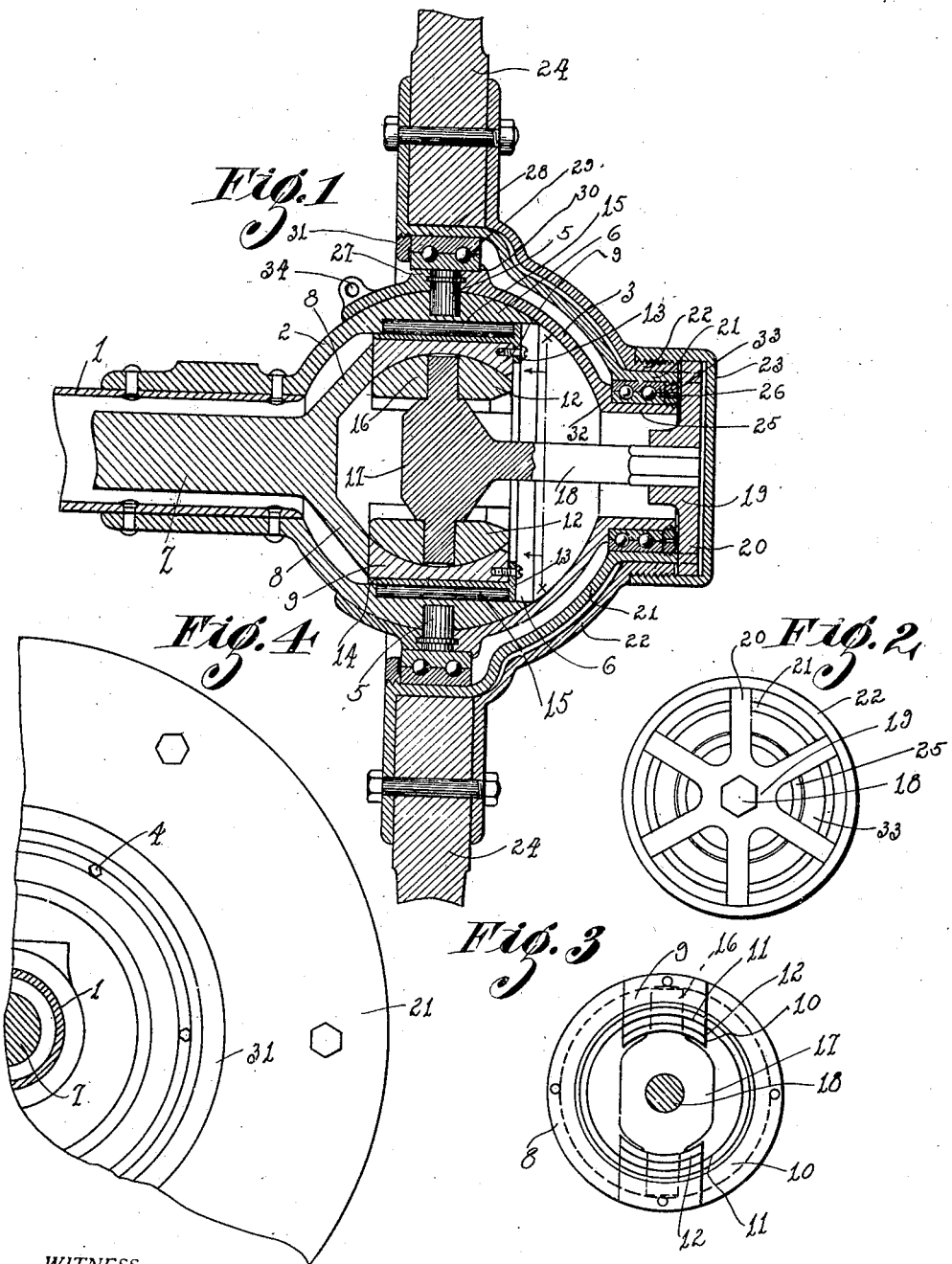

OVID H. ROGERS, OF SACRAMENTO, CALIFORNIA.

UNIVERSAL DRIVE FOR MOTOR-VEHICLE WHEELS.

1,244,778.

Specification of Letters Patent. Patented Oct. 30, 1917.

Application filed May 15, 1916. Serial No. 97,474.

*To all whom it may concern:*

Be it known that I, OVID H. ROGERS, a citizen of the United States, residing at Sacramento, in the county of Sacramento, State of California, have invented certain new and useful Improvements in Universal Drives for Motor-Vehicle Wheels; and I do declare the following to be a full, clear, and exact description of the same, reference being had to the accompanying drawings, and to the characters of reference marked thereon, which form a part of this application.

This invention relates to improvements in a driving means connecting the motors of motor vehicles and the wheels thereof, and is especially designed as a connection more particularly for use on the front wheels of a motor vehicle in order that the wheels may be driven by the motor of the vehicle and at the same time be readily turned in any direction desired for steering purposes. The advantages of such a structure are obvious without any special discussion of the same here.

A further object of the invention is to produce a simple and inexpensive device and yet one which will be exceedingly effective for the purposes for which it is designed.

These objects I accomplish by means of such structure and relative arrangement of parts as will more fully appear by a perusal of the following specification and claim.

In the drawings similar characters of reference indicate corresponding parts in the several views.

Figure 1 is a sectional view showing my improved universal knuckle or joint by means of which the wheel may be driven and at the same time turned in any direction.

Fig. 2 is an end view of the hub of the wheel with the cover cap removed.

Fig. 3 is a sectional view taken on a line X—X of Fig. 1 with the retaining ring removed.

Fig. 4 is a fragmentary view showing the inner face of the hub of my improved wheel.

Referring now more particularly to the characters of reference on the drawings, the numeral 1 designates the shaft housing for the driving axle of the wheels suitably fastened to the end of which is one section 2 of the joint housing, which section 2 is substantially semi-spherical in shape and turnably mounted on which is the other half of the joint housing 3 which is likewise semi-spherical in order to move freely over the surface of the portion 2 as shown. The housing 3 is formed in two parts suitably connected by bolts 4 in order that the same may be fitted over the part 2. While it is desired that the housing 3 may have a free swiveling motion on the housing 2, it is not desired that it have any rotary motion thereon, and therefore I provide pins 5 anchored in the housing 3 and turnable in the housing 2 substantially as shown in Fig. 1.

The housing 2 is provided with a circular recessed socket 6. The numeral designates the driving shaft, formed on which is the female jaw 8 on the universal joint. The male jaw comprises members or blocks 9 wedged into slots 10 in the jaw 8 and having semi-spherical inner surfaces 11 swiveled in which are blocks 12. The members 10 are held in position within the slots 11 by means of the retaining ring 13 provided with a normally extending sleeve 14 fitting around the jaw member 8. The retaining ring 13 also holds in position rollers 15 interposed between the sleeve 14 and the sides of the socket 6 so that the universal joint may have a free rotary movement within the housing 2. Swiveled within the blocks 12 are pins 16 on a knuckle 17, such knuckle 17 having a projecting pin 18 squared into a spider 19. The arms 20 of the spider 19 engage slots in two hub plates 21 and 22 and are held in position therein by a cap 23 screwed from the same onto the hub plate 22. The hub plates 21 and 22 arch over the housing 3 and extend on opposite sides of the spokes 24 of the wheel of the vehicle.

The housing 3 is provided with an end collar 25, and the hub plate 21 has a corresponding collar spaced from the collar 25, there being a suitable ball or roller bearing 26 interposed between the two to allow a free rotary motion of the plates 21 and 22 relative to the housing 3. For a similar reason, the housing 3 is provided with a shoulder 27 spaced from the sleeve 28 on the hub plate 21, there being a roller or ball bearing 29 interposed between the members 27 and 28. This roller or ball bearing 29 is held in place by abutting against a shoulder 30 on the housing 3 on one side and by a retaining ring 31 screwed into the plate 21 on the opposite side. Similarly the roller or ball bearing 26 is held in position by abutting against a shoulder 32 on the housing 3 and by a retaining ring 33 screwed into the outer end of the plate 21. The steering mechanism may be suitably connected with the housing 3 as at 34 or other suitable point. With the rotation of the driving shaft 7 motion will be imparted through the jaw 8 to the blocks 9 and 12, thence through the knuckle 17 to the pin 18, spider 19 and hub plates 21 and 22 to the wheel. This will rotate the wheel on the bearings 26 and 29 irrespective of direction in which the wheel may be turned since the universal joint allows of the necessary flexible action while the housings 2 and 3 being swiveled relative to each other allow of the wheel being turned in any desired direction and still being rotated by the power driving shaft. As will be noted, the housings 2 and 3 taken together form a perfect sphere which is concentric with the curved surfaces 11 so that there is a complete unity of action between all the parts when the wheel is turned in one direction or the other.

From the foregoing description it will be readily seen that I have produced such a device as substantially fulfils the object of invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A universal drive mechanism for motor vehicles comprising a joint housing consisting of two members swiveled one upon the other, the inner member being provided with an annular recess cut in from its end and terminating in a shoulder, a universal joint within the housing, an annular sleeve mounted on the joint and inclosing one side of the recess, rollers mounted within the recess and bearing between the sleeve and the inner housing member, the inner ends of the rollers abutting against the shoulder, a flange on the ring abutting against the other ends of the rollers to maintain them within the recess and a wheel turnable on the outside of the housing and connected in driving relation with the universal joint.

In testimony whereof I affix my signature.

OVID H. ROGERS.